INVENTORS.
JOHN K. ERZER
EUGENE E. MARTIN
BY
Robert H Montgomery
ATTORNEY

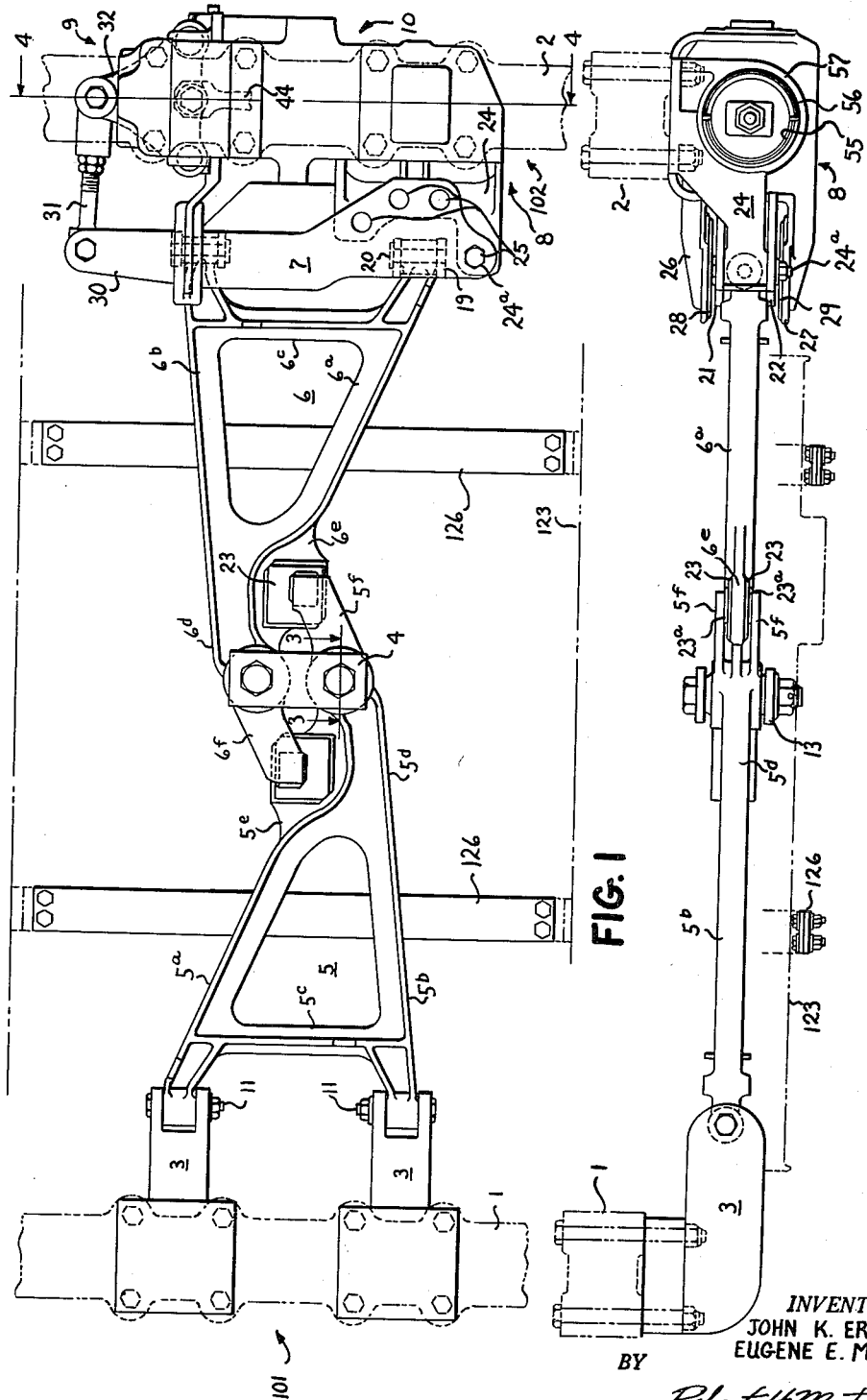

INTER-TRUCK CONTROL FORCE CHARACTERISTICS

INVENTORS.
JOHN K. ERZER
EUGENE E. MARTIN

BY Robert H Montgomery
ATTORNEY

United States Patent Office 3,054,361
Patented Sept. 18, 1962

3,054,361
INTER-TRUCK GUIDING CONTROL
John K. Erzer and Eugene E. Martin, Erie, Pa., assignors to General Electric Company, a corporation of New York
Filed Oct. 7, 1960, Ser. No. 61,309
8 Claims. (Cl. 105—168)

This invention relates to railway running gear, and more particularly relates to a mechanism for guiding the trucks of a rail vehicle into a curve while the rail vehicle is negotiating a curved section of track.

Railroad wheels are non-rotatively mounted on their axles and have flanges thereon which are inwardly disposed with respect to the rail to maintain the wheel and axle assemblies and the loads thereon on the track. A locomotive truck assembly is generally composed of a rigid truck frame supported on either two or three parallel axles. Two trucks disposed towards opposite ends of the vehicle carry the locomotive cab which is mounted on each truck on a center plate and retained thereon by means of a pivotal center pin allowing the trucks independent pivotal movement. This type of truck is often referred to as a swivel truck.

Inasmuch as there is a finite dimension between parallel axles and all wheels on one side of a truck essentially reside in a common plane, it may be seen that when the truck enters a turn at least the leading wheel on the outside of the turn will tend to travel in a tangent to the curve. The truck is prevented from derailing by the force exerted on this leading wheel flange by the outside rail. This anti-derailing force of rail on flange, coupled with sliding of the flange on the rail as the wheel rotates and otherwise moves about a curve, causes relatively rapid wear on the flange and where the railroad has many curves, it is not uncommon to have a wheel condemned for flange wear when the wheel tread is well within the wear limit. Wheels with thin flanges thereon can spit a switch which may result in derailment and therefore a large amount of damage to rolling equipment and track. It is apparent also that the restraining force exerted on the flange by the rail is exerted in a direction forming an acute angle of attack with the plane of the flange and therefore concentrated in a relatively small area of the flange which further contributes to flange wear. While flange wear predominates on the outside leading wheel of a truck, it is apparent, due to the rigidity of the truck and wheel and axle assemblies, that it may also exist to a lesser extent with respect to the inner trailing wheel flange on the inside rail of the curve, and all leading and trailing wheels will be subjected to the described flange wear dependent on direction of travel of the rail vehicle and direction of curves negotiated. Furthermore, a thin flange, or one with faults therein, may be stressed to the point of fracture which could result in a derailment.

In view of these inherent problems existing with respect to flanged wheels on curved track, we have provided a new and improved intertruck guiding and centering mechanism between the trucks of a locomotive or car which guides the trucks of a rail vehicle into the curve when the rail vehicle negotiates a curve and tends to center each truck while in the curve to thereby reduce flange wear and stresses imposed on wheel flanges due to the tendency of trucks to travel tangent to the curve.

Therefore, among the objects of this invention is the provision of a new and improved inter-truck guiding means between swivel trucks of a rail vehicle, the provision of such guiding means interconnecting trucks which are separated by a significant dimension, which is self-supporting, which does not restrict suspension of under-car equipment between trucks of such structure, which allows adjustment of the degree of guiding exerted on the trucks and which does not hinder independent motion of the trucks on straight track.

Briefly stated, this invention in one form thereof provides an expandable linkage of rigid members connected between inboard end ties of swivel trucks which exert guiding forces on the trucks while the rail vehicle is negotiating a curve to turn the trucks into the curve. Expansion of the linkage is caused by deviations of the center lines of the trucks from coincidence, which is sensed by a force-transmitting linkage and applied to inter-truck guiding force control means which controls the guiding forces exerted through the expandable linkage to guide the trucks into the curve.

The subject matter which we believe to be novel and which we claim as our invention is defined with particularity in the appended claims annexed to and forming part of this specification. However, the invention, together with further objects and advantages thereof, will be more fully appreciated by reference to the following detailed description of a preferred embodiment of the invention disclosed in conjunction with the following drawings wherein:

FIGURE 1 is a plan view of an inter-truck guiding mechanism embodying our invention;

FIGURE 2 is an elevation of the mechanism of FIGURE 1;

Figure 4:
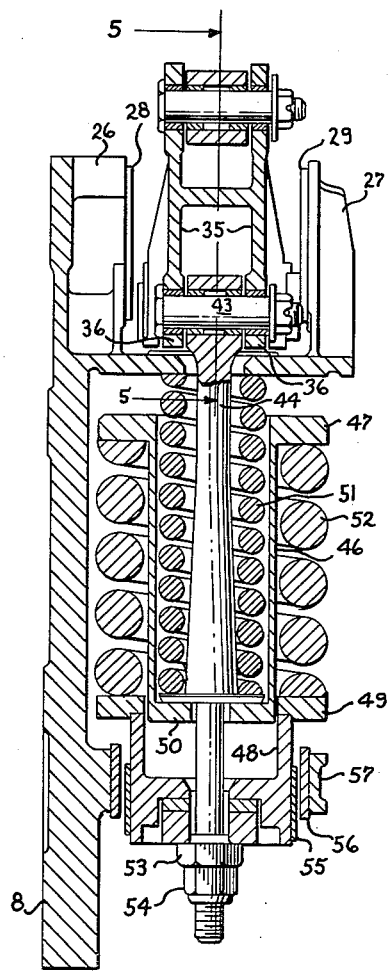
FIGURE 4 is a view taken along section 4—4 of FIGURE 1.

A mechanism embodying the invention is illustrated in detail in the drawings. However, to avoid description of common mechanical details of construction, no description or discussion is made or reference numerals applied to such construction as pivot pins, pivot pin bushings, retaining nuts, etc., unless such reference facilitates orientation between the several views or otherwise adds clarity to the disclosure.

Reference is first made to FIGS. 1 and 2, wherein we show the inboard end ties 1 and 2 of trucks 101 and 102, not fully illustrated in FIGS. 1 and 2. The trucks 101 and 102 are of the type comprising a rigid frame supported on journal boxes in which the axles are journaled by suitable bearing means, and having end ties and intermediate cross ties rigidly connecting mated side portions. Each truck supports one end of a rail vehicle and is pivotally connected thereto. The rail vehicle may be a locomotive driven by axle-hung traction motors positioned within the truck between truck frame sides.

The major elements of the illustrated mechanism embodying the present invention may be considered to be rigid link 4 pivotally interconnecting guiding levers 5 and 6, preferably identical, operating lever 7 pivotally connected at one end thereof to a mechanical operator 8 and at the other end thereof through force-transmitting linkage 9 to inter-truck guiding force control means 10 supported on mechanical operator 8 which is rigidly secured to end tie 2.

Rigidly secured to the underside of end tie 1 are truck bracket clevises 3, preferably equally spaced on opposite sides of the center line of the locomotive which in FIG. 1 coincides with the longitudinal center lines of the trucks.

Figure 3:
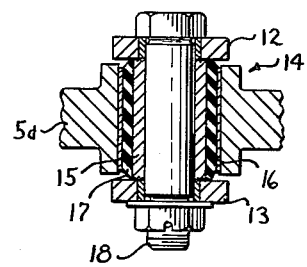
FIGURE 3 is a view taken along section 3—3 of FIGURE 1.

Lever 5, which for structural strength is preferably made in the form of a yoke or A-frame, has arms 5a and 5b pinned in clevises 3 to make lever 5 rigid with respect to end tie 1 with respect to horizontal movement, but to allow rotational movement of the lever 5 about pins 11 so that pitching motion of truck 101 will not produce resultant forces in levers 5 and 6. The arms 5a and 5b, interconnected by stiffening member 5c, merge into portion 5d which is pivotally connected to rigid link 4. As illustrated, link 4 may comprise upper and lower link members 12 and 13. It is desirable to provide a resilient connection between lever 5 and link 4 to absorb any twisting movements of lever 5 which might result from truck 101 passing over a bump or other irregularity in one track. A suitable resilient connection, shown in FIG. 3, comprises a pivot pin bushing 14 having inner and outer cylindrical bearing portions 15 and 16 respectively, with a rubber sleeve 17 bonded therebetween. The bushing 14 is interposed between pivot pin 18 and portion 5d of lever 5.

Lever 6 is preferably identical to lever 5, and therefore its configuring portions are identified by numerals 6 bearing annexed lower case letters corresponding to those identifying like portions of lever 5. Arms 6a and 6b of lever 6 are pinned in brackets 19 by pins 20 secured between lever members 21 and 22 which comprise operating lever 7. This connection between lever 6 and operating lever 7 allows rotation of lever 6 about the pins 20 so that pitching motion of truck 102 does not transmit resultant forces through levers 5 and 6. However, this connection provides a rigid connection between lever 6 and operating lever 7 with respect to horizontal motion. Lever 6 is pivotally connected to link 4 in the same manner as lever 5.

The inter-truck guiding levers 5 and 6 are arranged to be mutually self-supporting to avoid loading the resilient connections therebetween and further to avoid application of bending moments to link 4. Each of the levers 5 and 6 is provided with fillet portions 5e and 6e respectively, and jaw portions 5f and 6f which over and underlie the fillet portion of the other lever. Fillet portion 6e has wear plates 23 on the surfaces thereof which together with wear plates 23a on facing surfaces of jaws 5f, form bearing surfaces which provide mutual self-support of the interconnected ends of levers 5 and 6, and which serve as guides during relative movement of the levers. The relationship of jaws 6f and fillet portion 5e is the same as that described for jaws 5f and fillet portion 6e.

It may be seen that operating lever 7, formed of vertically spaced lever members 21 and 22, is pivotally secured at one end thereof to an extending pivot support portion 24 of mechanical operator 8 by means of a pivot pin 24a. Additional pivot pin receiving holes 25 are defined in lever 7 to allow adjustment of the effective length of lever 7 for reasons hereinafter described.

The mechanical operator 8 has oppositely vertically disposed jaws 26 and 27 extending therefrom with wear plates 28 and 29 thereon respectively to provide bearing surfaces for members 21 and 22 of lever 7. The movable end 30 of lever 7 is pivotally connected to force-transmitting linkage 9 which comprises an adjustable link 31, in turn pivotally connected to a rocker assembly 32.

Figure 5:
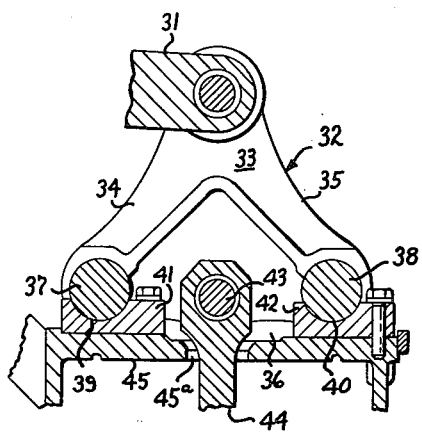
FIGURE 5 is a view taken along section 5—5 of FIGURE 4.

Reference is now particularly made to FIGS. 4 and 5 which illustrate force-transmitting linkage 9 and inter-truck guiding force control means 10. The rocker assembly 32 comprises a rocker 33 having equal lever arms 34 and 35 and rocker member 36 interconnecting arms 34 and 35. Each of the lever arms 34 and 35 and the rocker member 36 retain therebetween at their junctions rollers 37 and 38 which are engaged adjacent the ends thereof, the intermediate portions of the rollers fitting in the concave portions 39 and 40 provided therefor in roller seats 41 and 42, all respectively. The rollers 37 and 38 serve as fulcrum points about which the lever arms 34 and 35 of rocker arm 33 may rotate. Rocker member 36 is arranged to carry a pin 43 which in turn carries a pull rod 44 at a point equidistant between the fulcrum points defined by rollers 37 and 38.

Roller seats 41 and 42 are secured to a ledge 45 of operator 8 which extends downward from the underside of end tie 2 to which operator 8 is rigidly secured. An aperture 45a is defined in ledge 45 through which pull rod 44 extends substantially parallel to end tie 2 through a first spring guide 46 having a spring seat 47 thereon, and a second spring guide 48 with spring seat 49 thereon. The second spring guide 48 has an internal dimension sufficient to allow it to move over the first spring guide 46. Seated between the ledge 45 and the bottom 50 of spring guide 46 is a coil spring 51 positioned about pull rod 44. A second coil spring 52 surrounds spring guide 46 and is seated between spring seats 47 and 49. Retaining and stop nuts 53 and 54 are threaded on the extending end of pull rod 44 to retain spring guide 48 and spring seat 49 thereon. Curved wear plates 55 are positioned on spring guide 48 to provide, with curved wear plates 56 on annular portion 57 of operator 8, bearing and positioning surfaces between annular portion 57 and spring guide 48.

It may be seen that when the rocker assembly 32 lifts pull rod 44, spring 51 will be compressed until spring seat 47 bottoms on ledge 45. Continued movement of pull rod 44 will then cause compression of spring 52. It will be seen that this action is caused by continued rotation of either lever arm 34 or 35 about the fulcrums provided by roller pins 37 and 38 respectively, and therefore the inter-truck guiding force control means 10 exerts equal forces on pull rod 44 for either direction of rotation of rocker 33. The purpose of providing two springs 51 and 52 is hereinafter described.

The operation of the mechanism as thus far described will now be explained. Assume that the lever 6 in FIG. 1 is caused to move clockwise. Lever 6 will exert a force on operating lever 7, tending to move lever 7 in a clockwise direction. Lever 7 will cause link 31 to move toward rocker assembly 32 causing arm 35 to rotate about roller 38 to compress spring 51 and perhaps 52. As the lever 6 moves in a clockwise direction, it exerts a force on lever 5 through link 4 to cause lever 5, and hence end tie 1, to rotate counterclockwise. Lever 5 exerts a substantially equal reactive force on lever 6 through link 4 to cause counterclockwise movement of lever 6 against the compression of spring 51 tending to rotate end tie 2 counterclockwise. It is readily apparent that compression of spring 51 an amount determined by its spring constant renders lever 6 effectively rigid with respect to end tie 2 in the direction specified.

Figure 7:
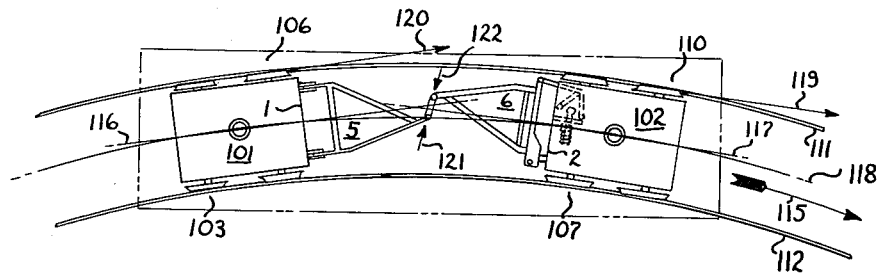
FIGURES 6 and 7 are diagrammatic illustrations of the operation of mechanisms of FIGURES 1–5.
Figure 6:
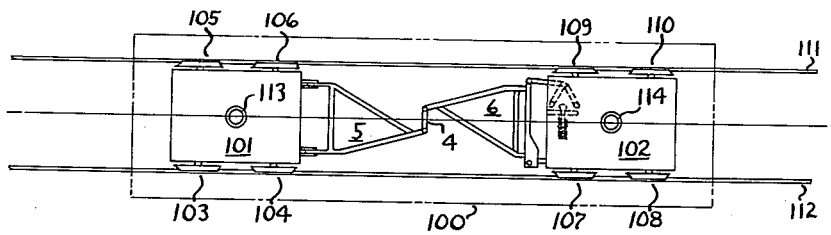

For a description of the guiding forces which the described mechanism exerts on the trucks of a rail vehicle when the rail vehicle is negotiating a turn, reference is now made to FIGS. 6 and 7. In FIG. 6, we show diagrammatically a locomotive cab 100 mounted on trucks 101 and 102, in turn mounted on flanged wheels 103—106 and 107—110, which are on rails 111 and 112. In FIG. 6, which represents the locomotive on straight track, the center line of the rail vehicle, the track as represented by rails 111 and 112 and longitudinal center line of trucks 101 and 102 coincide in the plan view. It will be further noted that the centers 113 and 114 about which the trucks are pivoted to the locomotive are fixed with respect to the rail vehicle body and therefore fixed in distance with respect to each other. Levers 5 and 6, as shown in FIGS. 1 and 2, are interconnected by a rigid link 4 as previously disclosed. Reference is now made to FIG. 7, which shows the rail vehicle of FIG. 6 negotiating a curve in the track formed by rails 111 and 112 in the direction indicated by arrow 115. It will be noted that the distance between the center pins 113 and 114 of the rail vehicle does not change inasmuch as the center pins are fixed with respect to the rail vehicle 100, that the center pins 113 and 114 are the axes of rotation of the trucks 101 and 102 with respect to the cab 100 when the trucks are negotiating a curve, and that the longitudinal center lines 116 and 117 of trucks 101 and 102 respectively intersect at a point outside of the radius of curvature of the track, which is the center line of rails 111 and 112, as the trucks independently rotate about the centers 113 and 114 while negotiating the curve. When the locomotive 100 is proceeding in the direction of arrow 115, the trucks 101 and 102 have instantaneous directions of travel, as represented by the arrows 119 and 120, tangent to the curve. Therefore, the flanges of wheels 106 and 110 are contacting the rail 111 at an acute angle. The rail 111, however, exerts sufficient force on the flanges of wheels 106 and 110 to cause the trucks to follow the rail and not depart therefrom at a tangent. However, it will be readily apparent that the contact force between rail and wheel flange greatly increases the friction between the wheel flange and rail which will cause rapid wear on the flange.

The inter-truck guiding mechanism disclosed acts to minimize this flange wear by turning the trucks 101 and 102 into the curve to thereby reduce the contact force between rail and wheel flanges. As lever 5 on truck 101 tends to move out over the center line of the track, it exerts a force on link 4 to impart an outwardly directed force, represented by the arrow 121, to lever 6 through link 4. This force acts to shift the inboard end of truck 102 outwardly of the turn to thereby turn the forward end of truck 102 into the turn and reduce the angle of attack of wheel 110 on rail 111 and tends to center truck 102 with respect to its longitudinal center line and the tangent to the track center line. This guiding of truck 102 into the curve and the reduction of the angle of attack reduces the force exerted on the flange of wheel 110 by the rails. In exerting this guiding force on lever 6, lever 5 must first compress the spring mechanism which, acting through lever 6, causes a reactive force on lever 5 in the direction represented by the arrow 122. Inasmuch as lever 5 is rigid with truck 101 with respect to horizontal movement, the force exerted on lever 5 pulls the front end of truck 101 into the curve to guide truck 101 into the curve while the rail vehicle is negotiating the curve. Operatively and functionally stated, the force-transmitting linkage detects offset of the longitudinal center lines of the trucks.

While we have illustrated the guide forces in one direction of travel and one direction of curvature only, it will be apparent that a force exerted on one of the levers 5 or 6 by the other will cause the spring assembly to produce interacting forces on the levers through the rigid connecting link 4 to turn the trucks into a curve.

From the foregoing discussion, the importance of inter-truck guiding force control means becomes apparent. Without the control means 10 the guiding forces would be determined only by the mass of the parts and the reacting mass forces could become greater than the guiding forces and possibly produce an oscillatory condition. As illustrated in FIG. 7, in order for lever 6 to shift the end tie 2, and hence the trailing end of truck 102 outwardly, spring 51 (FIG. 4) must first be compressed a distance determined by the spring constant to render the lever 6 rigid with respect to end tie 2 to effect such shifting of the end tie. The spring 51 then produces a reactive force through lever 6 and link 4 to shift end tie 1 of truck 101 into the curve. It is now apparent that the inter-truck guiding forces are controlled in the illustrated embodiment of the invention by springs 51 and 52. The springs 51 and 52 are thus selected in accordance with the known truck and rail vehicle specifications and parameters to produce controlled inter-truck guiding forces related to the radius of curvature of the track curve being negotiated.

Figure 8:
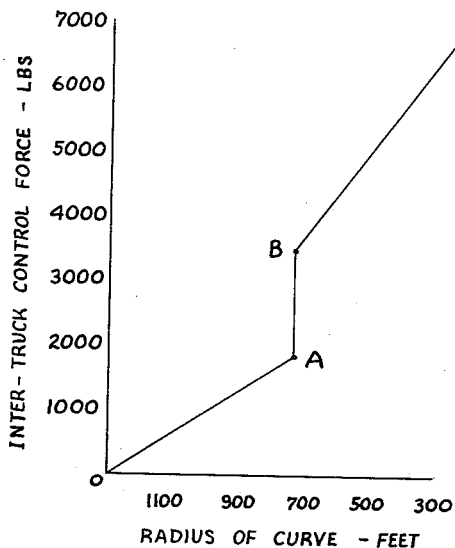
FIGURE 8 is a graph illustrating the relationship of truck guiding force and radius of curvature of a track section.

Reference is now made to FIG. 8, which illustrates a preferred typical control force-radius of curvature characteristic, wherein dimensional units are included for purposes of illustration only. It will be noted that this characteristic is a step function and at one radius of curvature, shown at approximately 700 feet, the control force increases at an essentially infinite rate.

We have found that above certain radii of curvature for given rail vehicles that one rate of application of control force is necessary to produce the desired inter-truck guiding. As is apparent or to be expected, smaller control forces are required for larger radius curves as illustrated by segment OA of the characteristic of FIG. 8. On these larger radii curves, approximately 700 feet and up as illustrated, the applied guiding forces are believed to cause shifting of the appropriate end of the trucks by elastic deformation of the fibers of the treads of the steel wheels. This phenomena is referred to as "creep."

As the radii decrease, "creep" is not sufficient to cause the desired shifting and the control force must slide the appropriate wheels on the track to effect the desired guidance. This action is represented in FIG. 8 by segment AB. In view of this phenomena, we have provided the second spring 62 which is pre-compressed between seats 47 and 49. Therefore the essentially infinite slope of segment AB also represents pre-compression of spring 52. When the critical radii are decreasingly passed, spring 52 then acts in the same manner from B to C, as spring 51 from O to A. Inasmuch as a greater inter-truck guiding control force is required on smaller radii turns, the spring constant of spring 52 is made greater than the spring constant of spring 51.

An important consideration in determining the inter-truck guiding control force necessary is the coefficient of adhesion between wheel and rail. The coefficient of adhesion will depend on presence of matter, such as moisture on the rail which may have a lubricating effect, climatic conditions, etc. Where the coefficient of adhesion is relatively high, the guiding force must be increased and vice versa.

Figure 9:
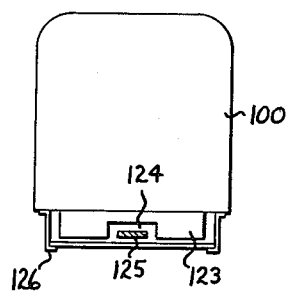
FIGURE 9 is a cross-sectional view in outline of a locomotive equipped with mechanism embodying the invention.

The mechanism which we have disclosed may be varied in some installations in accordance with the required operating conditions. For instance, only one spring might be used in the inter-truck guiding force control means 10; lever arrangements and lever structures may be varied for various and diverse reasons; the location of the inter-truck guiding force control means 10 and force-transmitting means 9 may be varied in location from that disclosed; and in some installations it might be further desirable to use a structure which includes operating levers such as lever 7 on each truck with suitable force control means associated with each lever. The inter-truck force control means 10 is not necessarily limited to the use of coil springs, although economically preferable, inasmuch as other reaction devices such as hydraulic or pneumatic apparatus could be arranged to operate to provide the required force-controlling function and produce the desired result. The disclosed mechanism embodying the invention is a preferred mechanism in that it is compact and relatively light in weight. A mechanism as disclosed increased the weight of a 212,000-pound locomotive only 800 pounds. Furthermore, it does not interfere with suspension of undercar equipment between the trucks and does not affect independent movement of the trucks on straight track. In this respect, attention is invited to FIG. 9, which in outline form illustrates a vertical section through locomotive 100 between the trucks, and in this illustration represents a diesel electric locomotive 100 wherein it is common practice to suspend the diesel fuel oil tank between the trucks. In such an installation, depending upon the depth of the tank 123, we may provide an inverted U channel 124 in the tank to allow installation of a mechanism, as indicated by reference numeral 125, embodying this invention. In FIG. 9 we also illustrate a common railroad operating procedure, that of providing safety straps 126 beneath suspended equipment.

With respect to the compactness of the disclosed mechanism, it will be noted that the truck guiding control mechanism as represented by the operator 8 and spring and rocker assemblies are positioned in a normally unused space beneath the inboard end tie 2 of truck 102, and do not extend any significant distance inwardly of the adjacent cavity defined by the truck frame, and therefore do not interfere with the mounting of traction motors therein.

As previously mentioned, alternate pivot holes are defined in lever 7 which may be utilized to vary the effective length of lever 7 to adjust for wheel flange wear.

While we have specifically illustrated and described an inter-truck guiding mechanism embodying our invention, and pointed out apparent modifications to this mechanism which might be utilized in practicing our invention, other mechanisms and/or changes and modifications to those disclosed may occur to those skilled in the art which do not depart from the spirit and scope of this invention. Accordingly, it is our intention to cover all changes and modifications of the assemblies of the invention herein chosen for purposes of disclosure which do not constitute departures from the spirit and scope of the invention.

What we claim as new and desire to secure by Letters Patent of the United States is:

1. In combination with a rail vehicle comprising a cab supported on rigid frame swivel trucks at points disposed towards opposite ends of the cab, mechanism for exerting controlled guiding forces on the trucks, when the rail vehicle is negotiating a curve, to guide the trucks into the curve, said mechanism comprising: linkage means interconnecting the inboard ends of the trucks which comprises; a first lever secured to the inboard end of one of the trucks and extending toward the second of the trucks, a second lever secured to a third lever horizontally disposed with respect to the inboard end of the second truck, and extending towards said first lever, said third lever being pivotally secured at one end thereof to the inboard end of the second truck, the extending ends of said first and second levers being pivotally interconnected by a rigid link and inter-truck force control means connected to the second end of said third lever to control the reactive forces between said first and second levers in proportion with the radius of the curve to effect controlled guiding of the trucks into the curve.

2. For use in combination with a rail vehicle comprising a cab supported on rigid frame swivel trucks at points disposed towards opposite ends of the cab, mechanism for exerting guiding forces on the trucks, when the rail vehicle is negotiating a curve, to guide the trucks into the curve; said mechanism comprising: linkage means interconnecting the inboard ends of the trucks which comprises a first lever secured to the inboard end of one of said trucks and extending towards the second truck, a second lever secured to the inboard end of the second of said trucks and extending toward the first truck, at least one of said levers being secured to a truck through another lever pivoted at one end thereof to the inboard end of one of the trucks for movement in a substantially horizontal plane, the extending ends of said first and second levers being pivotally interconnected by a rigid link and inter-truck force control means connected to the second end of said another lever to control the reactive forces between said first and second levers in proportion with the radius of the curve to effect controlled guiding of the trucks into the curve.

3. The mechanism of claim 2 wherein the point where said another lever is pivoted to the inboard end of one of the trucks may be varied to vary the effective length of said another lever.

4. In combination with a rail vehicle comprising a cab supported on rigid frame swivel trucks at points disposed opposite ends of the cab, mechanism for exerting controlled guiding forces on the trucks, when the rail vehicle is negotiating a curve, to guide the trucks into the curve, said mechanism comprising: linkage means interconnecting the inboard ends of the trucks which comprises; a first lever secured to the inboard end of one of said trucks and extending towards the second truck, a second lever secured to a third lever horizontally disposed with respect to the inboard end of the second of said trucks, said second lever extending toward the first truck, said third lever being pivoted at one end thereof to the inboard end of the second of said trucks for movement in a substantially horizontal plane, the extending ends of said first and second levers being pivotally interconnected by a rigid link, force-transmitting linkage means including a rocker mechanism connected between the second end of said third lever and inter-truck force control means mounted on the truck carrying said another lever, said control means comprising spring means compressible by a pull rod carried by said rocker mechanism, said spring means controlling the reaction forces to produce controlled turning moments on associated trucks about the truck swivel points proportional to the radius of the curve to effect controlled guiding of the trucks into the curve.

5. In combination with a rail vehicle comprising a cab supported on rigid frame swivel trucks at points disposed towards opposite ends of the cab, a mechanism for exerting controlled guiding forces on the trucks, when the rail vehicle is negotiating a curve, to guide the trucks into the curve; said mechanism comprising: a pair of levers adapted to be mounted each on the inboard end of opposite trucks, extend toward each other and have their extending ends pivotally interconnected, said levers being of generally V-shape with spaced arms adapted to be mounted on a truck merging into an extending end, the arms of a first of said levers being mounted on the inboard end of one of the trucks in a horizontal plane and having no relative horizontal motion with respect to said one of the trucks, one arm of the second of said levers being pivotally mounted on the inboard end of the second of the trucks, the arms of said second lever being disposed in a horizontal plane, a rigid link member pivotally connected at each end thereof between the extending ends of said levers, and inter-truck guiding force control means connected between the second arm of said second lever and the second truck to control reactive forces between the levers to produce controlled turning moments on associated trucks about the truck swivel points in proportion to the radius of the curve to effect controlled guiding of the trucks into the curve.

6. In combination with a rail vehicle comprising a cab supported on rigid frame swivel trucks at points disposed towards opposite ends of the cab, a mechanism for exerting controlled guiding forces on the trucks, when the rail vehicle is negotiating a curve, to guide the trucks into the curve; said mechanism comprising: a pair of levers adapted to be mounted each on the inboard end of opposite trucks, extend toward each other and have their extending ends pivotally interconnected, said levers being of generally V-shape with spaced arms adapted to be mounted on a truck merging into an extending end, the arms of a first of said levers being mounted on the inboard end of one of the trucks in a horizontal plane and having no relative horizontal motion with respect to said one of the trucks, one arm of the second of said levers being pivotally mounted on the inboard end of the second of the trucks, the arms of said second lever being disposed in a horizontal plane, a rigid link member pivotally connected at each end thereof between the extending ends of said levers, and inter-truck guiding force control means connected between the second arm of said second lever and the second truck to control reactive forces between the levers to produce controlled turning moments on associated trucks about the truck swivel points in proportion to the radius of the curve to effect controlled guiding of the trucks into the curve, each of said extending ends of said levers providing horizontal bearing surfaces and horizontal bearing surface engaging means, the bearing surfaces of each of said extending ends being horizontally interleaved with the bearing surface engaging means of the other whereby the extending ends of said levers are mutually self-supporting.

7. In combination with a rail vehicle comprising a cab supported on rigid frame swivel trucks at points disposed towards opposite ends of the cab, a mechanism for exerting controlled guiding forces on the trucks, when the rail vehicle is negotiating a curve, to guide the trucks into the curve; said mechanism comprising: a pair of levers adapted to be mounted each on the inboard end of opposite trucks, extend toward each other and have their extending ends pivotally interconnected, said levers having spaced arms adapted to be mounted on a truck, said arms merging into an extending end, the arms of a first of said levers being mounted on the inboard end of one of the trucks in a horizontal plane and having no relative horizontal motion with respect to said one of the trucks, one arm of the second of said levers being pivotally mounted on the inboard end of the second of the trucks, the arms of said second lever being disposed in a horizontal plane, a rigid link member pivotally connected at each end thereof between the extending ends of said levers, and inter-truck guiding force control means connected between the second arm of said second lever and the second truck to control reactive forces between the levers to produce controlled turning moments on associated trucks about the truck swivel points in proportion to the radius of the curve to effect controlled guiding of the trucks into the curve.

8. In combination with a rail vehicle comprising a cab supported on rigid frame swivel trucks at points disposed towards opposite ends of the cab, a mechanism for exerting controlled guiding forces on the trucks, when the rail vehicle is negotiating a curve, to guide the trucks into the curve; said mechanism comprising: a pair of levers adapted to be mounted each on the inboard end of opposite trucks, extend toward each other and have their extending ends pivotally interconnected, said levers having spaced arms adapted to be mounted on a truck, said arms merging into an extending end, the arms of a first of said levers being mounted on the inboard end of one of the trucks in a horizontal plane and having no relative horizontal motion with respect to said one of the trucks, one arm of the second of said levers being pivotally mounted on the inboard end of the second of the trucks, the arms of said second lever being disposed in a horizontal plane, a rigid link member pivotally connected at each end thereof between the extending ends of said levers, and inter-truck guiding force control means connected between the second arm of said second lever and the second truck to control reactive forces between the levers to produce controlled turning moments on associated trucks about the truck swivel points in proportion to the radius of the curve to effect controlled guiding of the trucks into the curve, each of said extending ends of said levers providing horizontal bearing surfaces and horizontal bearing surface engaging means, the bearing surfaces of each of said extending ends being horizontally interleaved with the bearing surface engaging means of the other whereby the extending ends of said levers are mutually self-supporting.

References Cited in the file of this patent

UNITED STATES PATENTS

| 278,770 | Brown | June 5, 1883 |
| 1,728,096 | Algrain | Sept. 10, 1929 |

FOREIGN PATENTS

| 742,129 | Great Britain | Dec. 21, 1955 |
| 125,853 | Switzerland | May 16, 1928 |